(12) United States Patent
Akiyama (10) Patent No.: US 7,643,107 B2
(45) Date of Patent: Jan. 5, 2010

(54) LIQUID CRYSTAL DISPLAY APPARATUS

(75) Inventor: Takashi Akiyama, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 214 days.

(21) Appl. No.: 11/797,172

(22) Filed: May 1, 2007

(65) Prior Publication Data

US 2008/0273145 A1    Nov. 6, 2008

(51) Int. Cl.
G02F 1/133    (2006.01)
(52) U.S. Cl. ............................................ 349/83; 345/4
(58) Field of Classification Search ...................... None
See application file for complete search history.

(56) References Cited

U.S. PATENT DOCUMENTS

| | | | | |
|---|---|---|---|---|
| 4,886,343 A | * | 12/1989 | Johnson | 349/78 |
| 4,966,441 A | * | 10/1990 | Conner | 349/80 |
| 5,296,952 A | * | 3/1994 | Takatsu et al. | 349/77 |
| 6,466,202 B1 | * | 10/2002 | Suso et al. | 345/169 |
| 6,593,901 B1 | * | 7/2003 | Kitazawa et al. | 345/4 |

FOREIGN PATENT DOCUMENTS

| | | | |
|---|---|---|---|
| JP | 11-258603 | | 9/1999 |
| JP | 2000-250006 A | * | 9/2000 |
| JP | 3154498 | | 2/2001 |

* cited by examiner

*Primary Examiner*—Mike Stahl
(74) *Attorney, Agent, or Firm*—Finnegan, Henderson, Farabow, Garrett & Dunner, L.L.P.

(57) ABSTRACT

An object of the present invention is to provide a liquid crystal display apparatus which comprises two liquid crystal display stacked one on top of the other, and which is switchable between two states, a state in which only the viewer-side liquid crystal panel is operated and a state in which only the other liquid crystal panel is operated. More specifically, a liquid crystal display apparatus according to the present invention includes a first liquid crystal display and a second liquid crystal display disposed above the first liquid crystal display with the viewing side of each of the displays facing upward, wherein the first liquid crystal display has at least one viewing mode, a transmissive mode or a reflective mode, and the second liquid crystal display has at least one viewing mode, the transmissive mode or the reflective mode, and wherein the maximum power consumption of the second liquid crystal display is smaller than that of the first liquid crystal display.

14 Claims, 8 Drawing Sheets

LIQUID CRYSTAL DISPLAY APPARATUS

The entire content of Japanese Patent Application No. 2005-318675 is hereby incorporated by reference.

FIELD OF THE INVENTION

The present invention relates to a liquid crystal display apparatus, and more particularly to a liquid crystal display apparatus having two liquid crystal displays which are viewable from only one side of the apparatus.

BACKGROUND OF THE INVENTION

It is known to provide a liquid crystal display apparatus which comprises two liquid crystal panels stacked one on top of the other, and in which the first liquid crystal panel disposed on the viewer side is used as a shutter so as to be able to conceal a portion of the display of the second liquid crystal panel (for example, patent document 1). In such a liquid crystal display apparatus, a secret mode or the like can be achieved by concealing a portion of the display of the second liquid crystal panel.

It is also known to provide a liquid crystal display apparatus which comprises two liquid crystal panels stacked one on top of the other, and in which the liquid crystal panel disposed on the backlight side is used as an open/close means so that good contrast can be obtained regardless of whether the other liquid crystal panel is operated in a reflective mode or a transmissive mode (for example, patent document 2). The backlight-side liquid crystal panel used as the open/close means has the function of allowing the light from the backlight to pass through when the backlight is on, and reflecting the light passed through the other liquid crystal panel when the other liquid crystal panel is operated in the reflective mode with the backlight turned off.

However, in either prior art liquid crystal display apparatus comprising two liquid crystal panels stacked one on top of the other, no attempts have ever been made to operate the two liquid crystal panels in a collaborative manner such that when one liquid crystal panel is turned on, the other liquid crystal panel is turned off, thereby reducing the power consumption of the liquid crystal display apparatus as a whole.

[Patent document 1] Japanese Patent No. 3154498 (FIGS. 1 and 5)

[Patent Document 2] Japanese Unexamined Patent Publication No. H11-258603 (FIG. 1)

SUMMARY OF THE INVENTION

It is an object of the present invention to provide a liquid crystal display apparatus which includes two liquid crystal panels stacked one on top of the other, and which is switchable between two states, a state in which only the viewer-side liquid crystal panel is operated and a state in which only the other liquid crystal panel is operated.

It is another object of the present invention to provide a liquid crystal display apparatus which includes two liquid crystal panels stacked one on top of the other, wherein when one liquid crystal panel is turned on, the other liquid crystal panel is turned off, thereby achieving a reduction in power consumption.

It is a further object of the present invention to provide a liquid crystal display apparatus which includes a first liquid crystal display capable of producing a detailed display and a second liquid crystal display for producing a simple display, wherein provisions are made to significantly reduce the power consumption of the liquid crystal display apparatus as a whole, in particular, when producing the display on the second liquid crystal display.

A liquid crystal display apparatus according to the present invention includes a first liquid crystal display and a second liquid crystal display disposed above the first liquid crystal display with the viewing side of each of the displays facing upward, wherein the first liquid crystal display has at least one viewing mode, a transmissive mode or a reflective mode, and the second liquid crystal display has at least one viewing mode, the transmissive mode or the reflective mode, and wherein the maximum power consumption of the second liquid crystal display is smaller than that of the first liquid crystal display.

Preferably, the liquid crystal display apparatus according to the present invention further includes a backlight, disposed behind the first liquid crystal display, for illuminating the first liquid crystal display.

Preferably, in the liquid crystal display apparatus according to the present invention, the display is switched between a first state in which the first liquid crystal display is operated with the backlight turned on while holding the second liquid crystal display off and a second state in which the second liquid crystal display is operated with the backlight turned off while holding the first liquid crystal display off.

Preferably, in the liquid crystal display apparatus according to the present invention, the second liquid crystal display has two viewing modes, the transmissive mode and the reflective mode.

Preferably, in the liquid crystal display apparatus according to the present invention, the second liquid crystal display has fewer pixels than the first liquid crystal display.

Preferably, in the liquid crystal display apparatus according to the present invention, the first liquid crystal display is dot-matrix driven by a passive driving method, and the second liquid crystal display is static-driven. This configuration serves to reduce as much as possible the power consumption of the second liquid crystal display that is used to produce a simple display.

Preferably, in the liquid crystal display apparatus according to the present invention, the second liquid crystal display is driven by a passive driving method, and the first liquid crystal display is driven by an active driving method.

Further preferably, in the liquid crystal display apparatus according to the present invention, the second liquid crystal display is static-driven or dot-matrix driven.

Preferably, the liquid crystal display apparatus according to the present invention further includes a first absorptive polarizer disposed between the first liquid crystal display and the backlight, a second absorptive polarizer disposed on an upper side of the second liquid crystal display, and a reflective polarizer, disposed between the first liquid crystal display and the second liquid crystal display, for reflecting external light that passed through the second liquid crystal display. In this configuration, the first liquid crystal display capable of producing a detailed display is operated in the transmissive mode, and the second liquid crystal display for producing a simple display is operated in the reflective mode.

Preferably, in the liquid crystal display apparatus according to the present invention, the first liquid crystal display is a polymer-scattered liquid crystal display.

Preferably, the liquid crystal display apparatus according to the present invention further includes a third absorptive polarizer disposed between the reflective polarizer and the first liquid crystal display.

Preferably, the liquid crystal display apparatus according to the present invention further includes a phase retarder disposed between the reflective polarizer and the first liquid crystal display, wherein the first liquid crystal display is a polymer-scattered liquid crystal display.

Preferably, the liquid crystal display apparatus according to the present invention further includes a color polarizer disposed between the second liquid crystal display and the reflective polarizer.

Preferably, the liquid crystal display apparatus according to the present invention further includes a third absorptive polarizer disposed between the reflective polarizer and the first liquid crystal display.

Preferably, the liquid crystal display apparatus according to the present invention further includes a first absorptive polarizer disposed between the first liquid crystal display and the backlight, a second absorptive polarizer disposed on an upper side of the second liquid crystal display, and a fourth absorptive polarizer disposed between the first liquid crystal display and the second liquid crystal display, and wherein the first liquid crystal display is a transflective liquid crystal display capable of reflecting external light that passed through the second liquid crystal display.

Preferably, the liquid crystal display apparatus according to the present invention further includes a first absorptive polarizer disposed between the first liquid crystal display and the backlight, a color polarizer disposed on an upper side of the second liquid crystal display, and a reflective polarizer, disposed between the first liquid crystal display and the second liquid crystal display, for reflecting external light that passed through the second liquid crystal display.

Preferably, the liquid crystal display apparatus according to the present invention further includes a third absorptive polarizer disposed between the reflective polarizer and the first liquid crystal display.

A liquid crystal display apparatus according to the present invention includes a first liquid crystal display, a second liquid crystal display disposed above the first liquid crystal display, and capable of transmitting an image displayed on the first liquid crystal display, a backlight, disposed behind the first liquid crystal display, for illuminating the first liquid crystal display, and a reflective polarizer which transmits light emitted from the backlight and passed through the first liquid crystal display when the first liquid crystal display is in an on state, and which reflects light that passed through the second liquid crystal display when the second liquid crystal display is in an off state.

In the liquid crystal display apparatus according to the present invention, since control is performed so that when one of the liquid crystal panels is turned on, the other liquid crystal panel is always turned off, the power consumption can be reduced at all times.

Furthermore, the liquid crystal display apparatus according to the present invention is constructed so that when static-driving the second liquid crystal display that is used to produce a simple display, the first liquid crystal display for producing a detailed display is turned off, and the backlight is also turned off; as a result, when the second liquid crystal display is used, for example, to produce a standby screen on a mobile phone, the standby power consumption can be significantly reduced.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

A liquid crystal display apparatus according to the present invention will be described below with reference to the drawings. It will, however, be understood that the present invention is not limited to any specific embodiment described herein or illustrated in the drawings.

Figure 1:
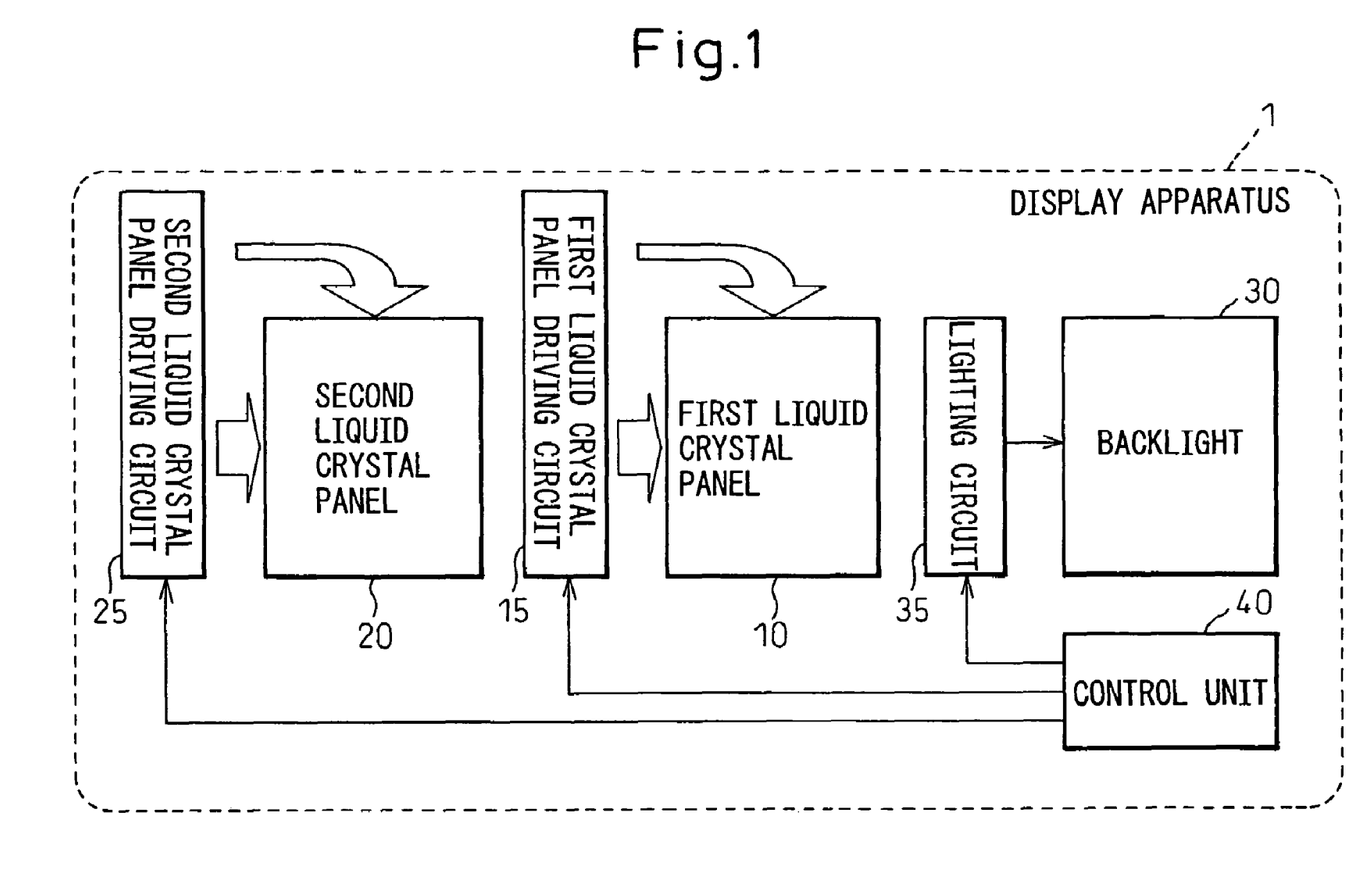
FIG. 1 is a diagram showing the basic configuration of a liquid crystal display apparatus 1 according to the present invention.

FIG. 1 is a diagram showing the basic configuration of a liquid crystal display apparatus 1 according to the present invention.

As shown in FIG. 1, the liquid crystal display apparatus 1 comprises a first liquid crystal panel 10, a first liquid crystal panel driving circuit 15, a second liquid crystal panel 20, a second liquid crystal panel driving circuit 25, a backlight 30, a lighting circuit 35, and a control unit 40.

The first liquid crystal panel 10 is a TFT active-matrix liquid crystal display which can produce a 2.4-inch, QVGA-size (350×240 pixels) display. The first liquid crystal panel 10 is constructed by sealing a nematic liquid crystal layer between two transparent glass substrates by means of a sealing member, and a plurality of source electrodes and a plurality of gate electrodes are respectively formed by patterning a conductive material on the two glass substrates. To the source and gate electrodes are connected TFT devices one for each pixel. Alignment films for aligning the liquid crystal are formed over the respective electrodes, the alignment films being treated so as to produce a 90-degree twisted structure therebetween. With the provision of these alignment films, the liquid crystal layer is twisted through 90 degrees between them.

Here, the first liquid crystal panel 10 may be constructed using a polymer-scattered liquid crystal display. Examples of polymer-scattered liquid crystal display panels include a polymer-dispersed liquid crystal panel, a PN (polymer network) liquid crystal panel, etc. in which numerous tiny capsules containing liquid crystal molecules are dispersed through a binder.

The first liquid crystal panel driving circuit 15 controls the on/off state of the first liquid crystal panel 10 in accordance with a control signal from the control unit 40. In the on state, the first liquid crystal panel driving circuit 15 drives the first liquid crystal panel 10 by an active driving method by applying a prescribed voltage to the source and gate electrodes. In the off state, the first liquid crystal panel driving circuit 15 performs control so as not to drive the liquid crystal. Here, it is to be understood that the phrase "not to drive the liquid crystal" refers not only to the case where control is performed so that no voltage whatsoever is applied to the liquid crystal, but also to the case where a voltage lower than about one-half of the normal image display voltage is applied.

The second liquid crystal panel 20 is a static-driven transmissive TN liquid crystal display which can produce a 2.4-inch, 200-segment monochromatic display. The second liquid crystal panel 20 is constructed by sealing a TN liquid crystal layer between two transparent glass substrates by means of a sealing member, and a plurality of segment electrodes and a plurality of common electrodes are respectively formed by patterning a transparent conductive material on the two glass substrates. Every portion where a segment electrode overlaps a common electrode forms a display pixel.

Here, the second liquid crystal panel 20 may be constructed using a dot-matrix driven transmissive STN liquid crystal display or TN liquid crystal display. In particular, when a TN liquid crystal display is used which has high transmissivity, it becomes possible to enhance the crispness of the display produced on the first liquid crystal panel. On the other hand, when an STN liquid crystal display is used, matrix driving using a voltage averaging scheme becomes possible, which can drive a larger number of pixels.

The second liquid crystal panel driving circuit 25 controls the on/off state of the second liquid crystal panel 20 in accordance with a control signal from the control unit 40. In the on state, the second liquid crystal panel driving circuit 25 drives the second liquid crystal panel 20 by a static driving method by applying a prescribed voltage to the segment and common electrodes. In the off state, the second liquid crystal panel driving circuit 25 performs control so as not to drive the liquid crystal. Here, it is to be understood that the phrase "not to drive the liquid crystal" refers not only to the case where control is performed so that no voltage whatsoever is applied to the liquid crystal, but also to the case where a voltage lower than about one-half of the normal image display voltage is applied.

The backlight 30 comprises a white LED, a light guiding plate, etc., and functions as a surface-area light source for illuminating the first liquid crystal panel 10. The lighting circuit 35 controls the lighting operation of the white LED in accordance with a control signal from the control unit 40.

The control unit 40 comprises a CPU, RAM, ROM, etc., and controls the first and second liquid crystal panel driving circuits 15 and 25, the lighting circuit 35, etc. in accordance with programs prestored in the ROM, etc.

Figure 2:
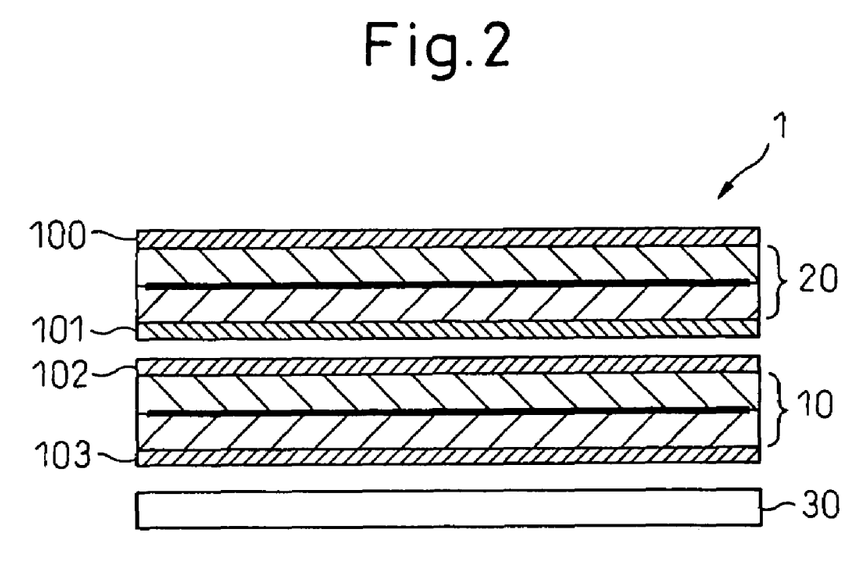
FIG. 2 is a schematic cross-sectional view of the liquid crystal display apparatus 1 shown in FIG. 1.

FIG. 2 is a schematic cross-sectional view of the liquid crystal display apparatus 1.

The liquid crystal display apparatus 1 comprises a first absorptive polarizer 100, second liquid crystal panel 20, reflective polarizer 101, third absorptive polarizer 102, first liquid crystal panel 10, second absorptive polarizer 103, and backlight 30, arranged in this order from the top to the bottom as viewed from the viewer side. That is, the first and second liquid crystal panels 10 and 20 are stacked one on top of the other. The reflective polarizer 101 has a transmission axis and a reflection axis oriented about 90 degrees with respect to the transmission axis, and has the property of reflecting light polarized parallel to the reflection axis. In the example of FIG. 2, DBEF (tradename) manufactured by Sumitomo 3M Limited is used as the reflective polarizer 101.

In FIG. 2, the first absorptive polarizer 100 and the reflective polarizer 101 are bonded to the respective transparent substrates of the second liquid crystal panel 20, while the second and third absorptive polarizers 103 and 102 are bonded to the respective transparent substrates of the first liquid crystal panel 10. In the illustrated example, no adhesive layer is interposed between the reflective polarizer 101 and the third absorptive polarizer 102. However, the reflective polarizer 101 and the third absorptive polarizer 102 may be bonded together, and the second liquid crystal panel 20 with the first absorptive polarizer 100 bonded thereto and the reflective polarizer 101 may be arranged without interposing an adhesive layer therebetween.

Figure 3:
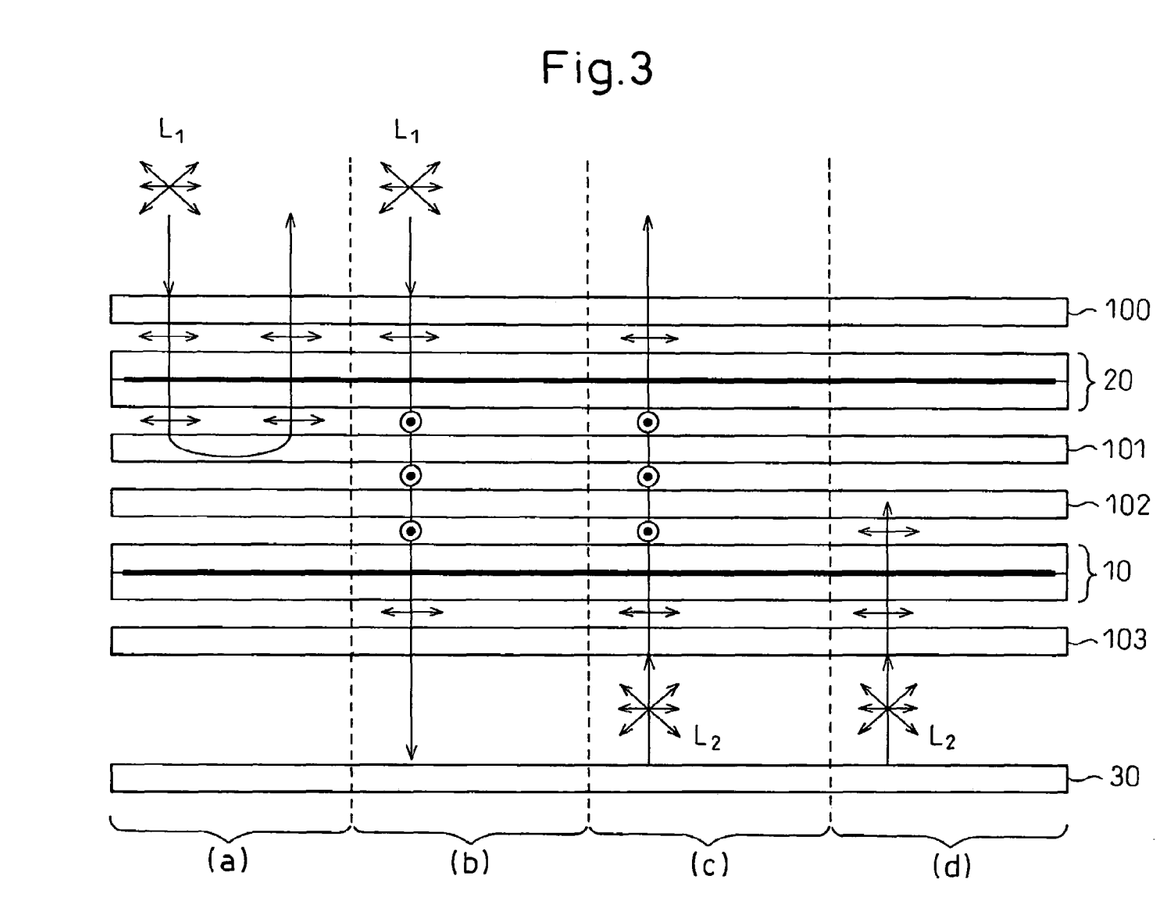
FIG. 3 is a diagram for explaining the operation of the liquid crystal display apparatus 1 shown in FIG. 1.

FIG. 3 is a diagram for explaining the operation of the liquid crystal display apparatus 1.

Parts (a) and (b) of FIG. 3 show the condition in which the second liquid crystal panel 20 is operated as a reflective liquid crystal panel with the backlight 30 turned off while holding the first liquid crystal panel 10 off. On the other hand, parts (c) and (d) of FIG. 3 show the condition in which the first liquid crystal panel 10 is operated as a transmissive liquid crystal panel with the backlight 30 turned on while holding the second liquid crystal panel 20 off.

The liquid crystal held in each of the first and second liquid crystal panels 10 and 20 is set so that when no driving voltage is applied to the liquid crystal corresponding to a given pixel, linearly polarized light entering the liquid crystal panel passes therethrough with its direction of polarization twisted about 90 degrees but, when a driving voltage is applied to the liquid crystal corresponding to the given pixel, the linearly polarized light entering the liquid crystal panel is allowed to pass through without changing its direction of polarization.

Part (a) of FIG. 3 shows the condition in which a driving voltage is applied to the liquid crystal corresponding to a given pixel in the second liquid crystal panel 20. In this case, of the external light (L1) incident on the first absorptive polarizer 100, only linearly polarized light oriented in the direction (the horizontal direction in the figure) parallel to the polarization axis of the first absorptive polarizer 100 is allowed to pass through and enters the second liquid crystal panel 20. The linearly polarized light entering the second liquid crystal panel 20 passes through without changing its direction of polarization. The reflection axis of the reflective polarizer 101 is oriented parallel to the direction of polarization of the light passed through the second liquid crystal panel 20. Accordingly, the light passed through the second liquid crystal panel 20 is reflected by the reflective polarizer 101, passes through the second liquid crystal panel 20 and the first absorptive polarizer 100, and emerges on the viewer side of the liquid crystal display apparatus. In this case, the pixel appears light (white) when viewed from the viewer side.

Part (b) of FIG. 3 shows the condition in which no driving voltage is applied to the liquid crystal corresponding to the given pixel in the second liquid crystal panel 20, or in which a driving voltage is applied to the liquid crystal but the liquid crystal is maintained in a substantially twisted condition. In this case, of the external light (L1) incident on the first absorptive polarizer 100, only linearly polarized light oriented in the direction (the horizontal direction in the figure) parallel to the polarization axis of the first absorptive polarizer 100 is allowed to pass through and enters the second liquid crystal panel 20. The linearly polarized light entering the second liquid crystal panel 20 passes therethrough with its direction of polarization twisted about 90 degrees. Since the transmission axis of the reflective polarizer 101 is oriented parallel to the direction of polarization of the light passed through the second liquid crystal panel 20, the light passed through the second liquid crystal panel 20 passes through the reflective polarizer 101. The light passed through the reflective polarizer 101 further passes through the third absorptive polarizer 102, the first liquid crystal panel 10, and the second absorptive polarizer 103, and is absorbed by the backlight 30. In this case, the pixel appears dark (black) when viewed from the viewer side.

Part (c) of FIG. 3 shows the condition in which no driving voltage is applied to the liquid crystal corresponding to a given pixel in the first liquid crystal panel 10. In this case, of the light (L2) emitted from the backlight 30 and incident on the second absorptive polarizer 103, only linearly polarized light oriented in the direction (the horizontal direction in the figure) parallel to the polarization axis of the second absorptive polarizer 103 is allowed to pass through and enters the first liquid crystal panel 10. The linearly polarized light entering the first liquid crystal panel 10 passes therethrough with its direction of polarization twisted about 90 degrees. Since the polarization axis of the third absorptive polarizer 102 and the transmission axis of the reflective polarizer 101 are both oriented parallel to the direction of polarization of the light passed through the first liquid crystal panel 10, the light passed through the first liquid crystal panel 10 passes through the third absorptive polarizer 102 and the reflective polarizer 101, and enters the second liquid crystal panel 20. Since the second liquid crystal panel 20 is held in the off state, the linearly polarized light entering the second liquid crystal panel 20 passes therethrough with its direction of polarization twisted about 90 degrees. Since the direction of polarization of the light passed through the second liquid crystal panel 20 is parallel to the first absorptive polarizer 100, the light passed through the second liquid crystal panel 20 passes through the first absorptive polarizer 100 and emerges on the viewer side of the liquid crystal display apparatus. In this case, the pixel appears light (white) when viewed from the viewer side.

Part (d) of FIG. 3 shows the condition in which a driving voltage is applied to the liquid crystal corresponding to the given pixel in the first liquid crystal panel 10. In this case, of the light (L2) emitted from the backlight 30 and incident on the second absorptive polarizer 103, only linearly polarized light oriented in the direction (the horizontal direction in the figure) parallel to the polarization axis of the second absorptive polarizer 103 is allowed to pass through and enters the first liquid crystal panel 10. The linearly polarized light entering the first liquid crystal panel 10 passes through without changing its direction of polarization. Since the direction of polarization of the light passed through the first liquid crystal panel 10 is displaced 90 degrees relative to the polarization axis of the third absorptive polarizer 102, the light passed through the first liquid crystal panel 10 is absorbed by the third absorptive polarizer 102. In this case, the pixel appears dark (black) when viewed from the viewer side.

In this way, in the liquid crystal display apparatus 1, when operating the first liquid crystal panel 10 in the transmissive mode, the second liquid crystal panel 20 is held in the off state (see parts (c) and (d) of FIG. 3), and when operating the second liquid crystal panel 20 in the reflective mode, the first liquid crystal panel 10 is held in the off state (see parts (a) and (b) of FIG. 3). That is, when operating the second liquid crystal panel, the first liquid crystal panel and the backlight 30 can be turned off to reduce the power consumption of the liquid crystal display apparatus as a whole. Here, it is important that the liquid crystal be set so as to allow the light passed through the first liquid crystal panel 10 to pass through the reflective polarizer 101 when the first liquid crystal panel is operated in the transmissive mode while holding the second liquid crystal panel 20 off.

Figure 4:
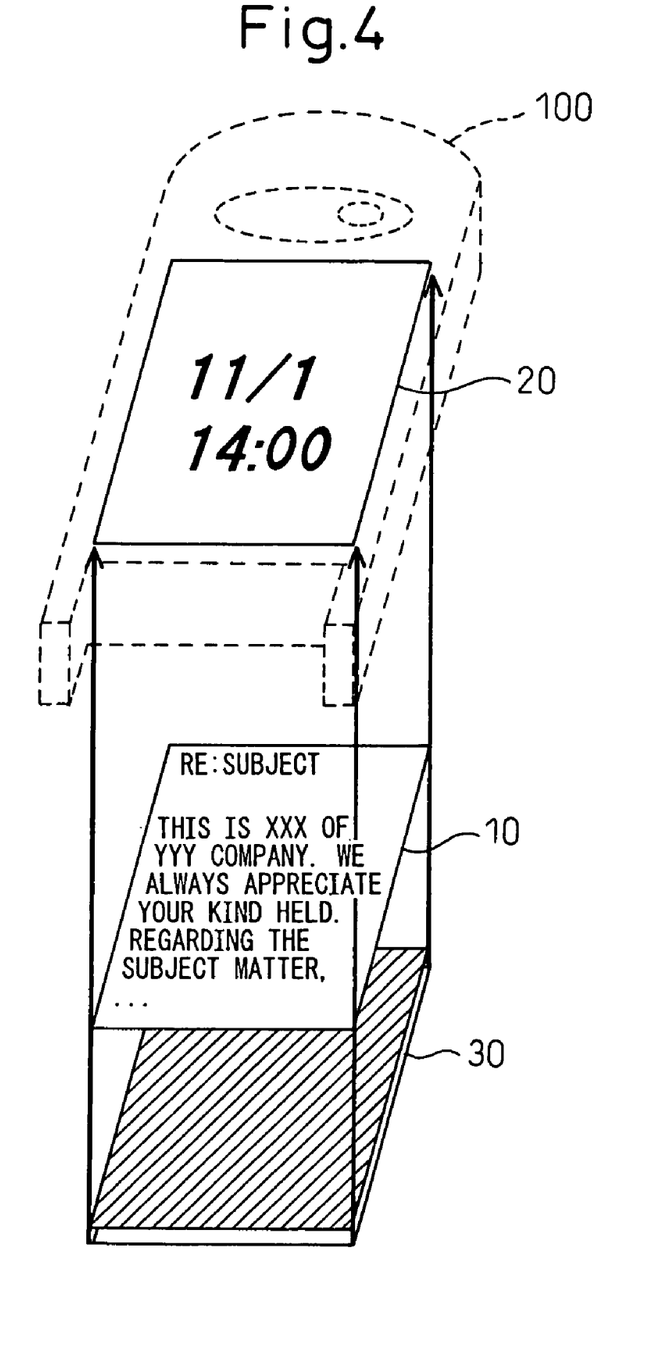
FIG. 4 is a diagram showing an example in which the liquid crystal display apparatus 1 shown in FIG. 1 is used as a display unit in a mobile phone.

FIG. 4 is a diagram showing an example in which the liquid crystal display apparatus 1 of the present invention is used as a display unit in a mobile phone.

Inside a display frame 100 of the mobile phone, there are arranged the second liquid crystal panel 20, the first liquid crystal panel 10, and the backlight 30, in this order from the top to the bottom as viewed from the viewer (user) side. The second liquid crystal panel 20 is used to produce a simple display for displaying a standby screen when the mobile phone is in standby mode. The first liquid crystal panel 10 is used to produce a detailed display, for example, for displaying a mail or network connection screen or for displaying a digital image captured by a digital camera built into the mobile phone. In the example of FIG. 4, current time and date is displayed on the second liquid crystal panel 20, but in addition to that, a mark indicating the current mode of the mobile phone, a mark indicating the reception condition, etc. may be displayed.

When the second liquid crystal panel 20 is operated in the reflective mode, since the first liquid crystal panel 10 is turned off, and the backlight 30 is also turned off, the power consumption of the liquid crystal display apparatus 1 as a whole can be held to an extremely low level (for example, 2 mW or less). As a result, when the mobile phone is not in use, the standby screen need not be turned off completely, and the second liquid crystal panel 20 can be left on for an extended period of time.

Generally, the power consumption, including that of driving circuitry, is larger in the case of active driving that uses switching devices than in the case of passive driving. In the passive driving, dot-matrix driving consumes more power than static driving.

In the liquid crystal display apparatus 1, the reflective polarizer 101 and the third absorptive polarizer 102 may be bonded together to prevent the formation of an air layer between them. In this case, reflections occurring at the interface between the air layer and the reflective polarizer 101 due to the difference in refractive index between them can be reduced, thereby reducing the loss of light from the backlight. Further, the reflective polarizer 101 may be constructed to have a light scattering function, or a light scattering layer may be interposed between the reflective polarizer 101 and the second liquid crystal panel 20. Such a structure serves to distribute reflected light evenly.

Here, the haze value (degree of scattering) of the scattering layer must be chosen properly. The reason is that if the haze value were set too high, then when viewing the first liquid crystal panel 10 with the second liquid crystal panel 20 turned off, the image light from the first liquid crystal panel 10 would be widely scattered at the scattering layer and blurred, degrading the display quality. It has been found that the degree of blurring that can be annoying to the viewer differs depending on the resolution of the first liquid crystal panel 10. The pixel pitch of a commonly used portable liquid crystal panel (1-inch to 2.4-inch size) is 0.18 to 0.24 mm; in view of this, the present inventor conducted experiments on 20 human subjects by using the first liquid crystal panel 10 with a 0.18-mm pitch, and made comparisons between the case where the haze value was varied and the case where the scattering layer was not provided. The results were as follows: when the haze value was 60, 100% of the subjects perceived that the blurring was annoying; when the haze value was 50, 70% of the subjects perceived that the blurring was annoying; when the haze value was 40, 10% of the subjects perceived that the blurring was annoying; and when the haze value was 30, 100% of the subjects said that the blurring was not visible. Accordingly, a haze value of 40 or less is optimum, and a higher haze value would cause image blurring and degrade image quality.

Figure 5:
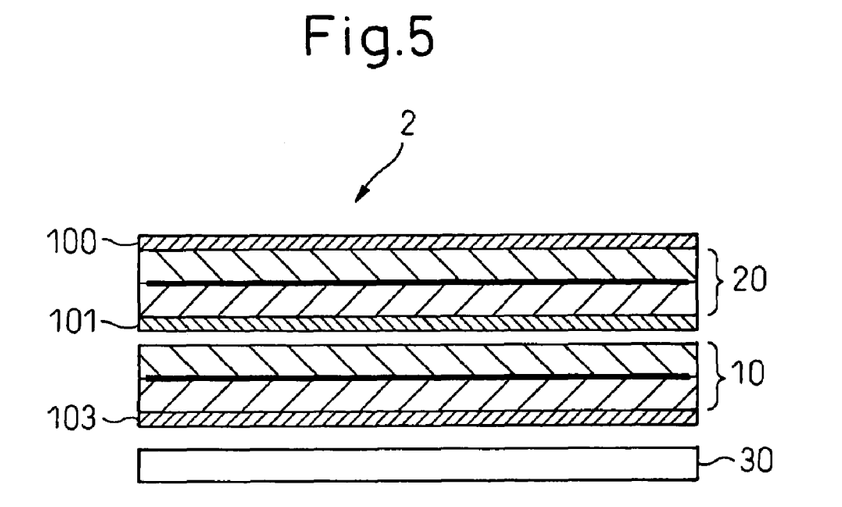
FIG. 5 is a schematic cross-sectional view of another liquid crystal display apparatus 2 according to the present invention.

FIG. 5 is a schematic cross-sectional view of another liquid crystal display apparatus 2 according to the present invention.

The liquid crystal display apparatus 2 shown in FIG. 5 differs from the liquid crystal display apparatus 1 shown in FIG. 2 in that the third absorptive polarizer 102 provided between the reflective polarizer 101 and the first liquid crystal panel 10 is eliminated. The elimination of the third absorptive polarizer 102 serves to reduce the thickness of the apparatus (for example, by about 150 μm), thus achieving a corresponding reduction in cost.

The operation of the liquid crystal display apparatus 2 shown in FIG. 5 is substantially the same as that shown in FIG. 3, except that the third absorptive polarizer 102 is eliminated, but the operation in the condition shown in FIG. 3(d) differs because of the elimination of the third absorptive polarizer 102. That is, the light passed through the first liquid crystal panel 10 is reflected by the reflective polarizer 101 and is not directed toward the viewer side. Accordingly, in the liquid crystal display apparatus 2 of FIG. 5 also, when operating the first liquid crystal panel 10 in the transmissive mode, the second liquid crystal panel 20 is held in the off state, and when operating the second liquid crystal panel 20 in the reflective mode, the first liquid crystal panel 10 is held in the off state. That is, when operating either one of the liquid crystal panels, the other liquid crystal panel can be held in the off state, thereby reducing the power consumption of the liquid crystal display apparatus as a whole. Further, in the liquid crystal display apparatus 2 also, the liquid crystal is set so as to allow the light passed through the first liquid crystal panel 10 to pass through the reflective polarizer 101 when the first liquid crystal panel 10 is operated in the transmissive mode.

Figure 6:
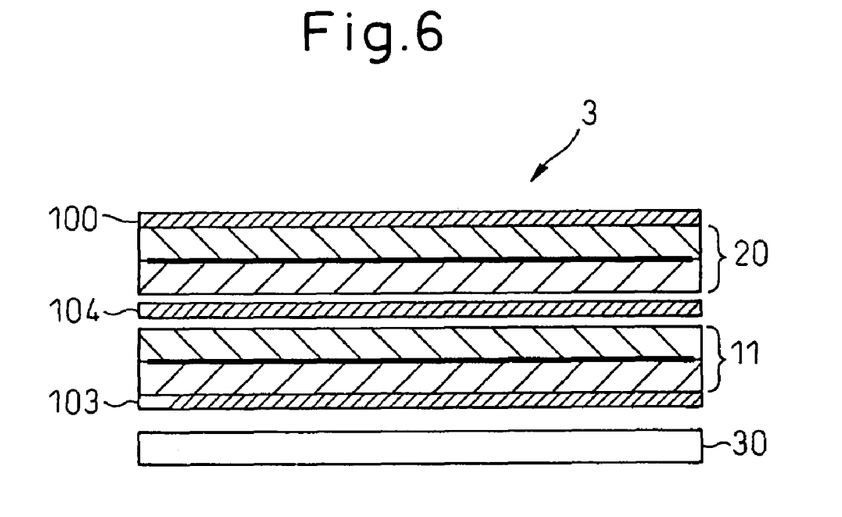
FIG. 6 is a schematic cross-sectional view of still another liquid crystal display apparatus 3 according to the present invention.

FIG. 6 is a schematic cross-sectional view of still another liquid crystal display apparatus 3 according to the present invention.

The liquid crystal display apparatus 3 shown in FIG. 6 differs from the liquid crystal display apparatus 1 shown in FIG. 2 in that the third absorptive polarizer 102 provided between the reflective polarizer 101 and the first liquid crystal panel 10 is eliminated, in that the reflective polarizer 101 is replaced by a fourth absorptive polarizer 104, and in that the first liquid crystal panel 10 is replaced by a transflective liquid crystal panel 11. The fourth absorptive polarizer 104 is needed to preserve the display quality of the first liquid crystal panel 10. If necessary, a phase retardation film may be added, or the fourth absorptive polarizer 104 may be omitted, depending on the liquid crystal mode of the first liquid crystal panel 10.

The transflective liquid crystal panel 11 is similar in structure to the first liquid crystal panel 10, and is constructed by forming a transflective film on the liquid crystal side of the lower or upper glass substrate of the first liquid crystal panel 10. More specifically, the first liquid crystal panel 10 is formed so as to also serve the function of the reflective polarizer 101 in the liquid crystal display apparatus 1 shown in FIG. 2.

Figure 7:
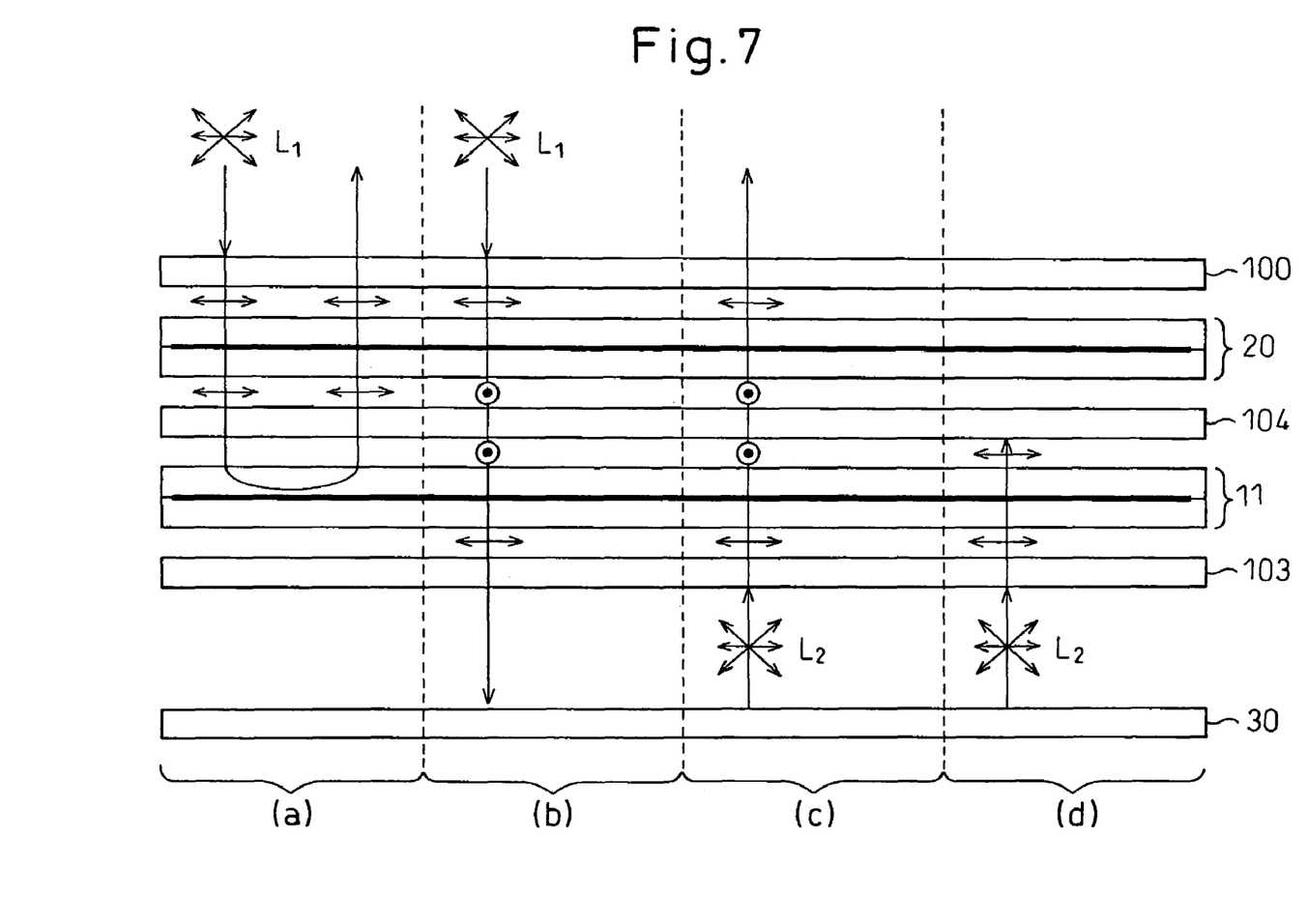
FIG. 7 is a diagram for explaining the operation of the liquid crystal display apparatus 3 shown in FIG. 6.

FIG. 7 is a diagram for explaining the operation of the liquid crystal display apparatus 3 shown in FIG. 6.

Parts (a) and (b) of FIG. 7 show the condition in which the second liquid crystal panel 20 is operated as a reflective liquid crystal panel with the backlight 30 turned off while holding the transflective liquid crystal panel 11 off. On the other hand, parts (c) and (d) of FIG. 7 show the condition in which the transflective liquid crystal panel 11 is operated as a transmissive liquid crystal panel with the backlight 30 turned on while holding the second liquid crystal panel 20 off.

The liquid crystal held in the transflective liquid crystal panel 11, like that in the first liquid crystal panel 10, is set so that when no driving voltage is applied to the liquid crystal corresponding to a given pixel, linearly polarized light entering the liquid crystal panel passes therethrough with its direction of polarization twisted about 90 degrees but, when a driving voltage is applied to the liquid crystal corresponding to the given pixel, the linearly polarized light entering the liquid crystal panel is allowed to pass through without changing its direction of polarization.

Part (a) of FIG. 7 shows the condition in which a driving voltage is applied to the liquid crystal corresponding to a given pixel in the second liquid crystal panel 20. In this case, of the external light (L1) incident on the first absorptive polarizer 100, only linearly polarized light oriented in the direction (the horizontal direction in the figure) parallel to the polarization axis of the first absorptive polarizer 100 is allowed to pass through and enters the second liquid crystal panel 20. The linearly polarized light entering the second liquid crystal panel 20 passes through without changing its direction of polarization. The light passed through the second liquid crystal panel 20 passes through the fourth absorptive polarizer 104, and enters the transflective liquid crystal panel 11. The reflection axis of the transflective film of the transflective liquid crystal panel 11 is oriented parallel to the direction of polarization of the light passed through the fourth absorptive polarizer 104. Accordingly, the light passed through the fourth absorptive polarizer 104 is reflected by the transflective liquid crystal panel 11, passes through the fourth absorptive polarizer 104, the second liquid crystal panel 20, and the first absorptive polarizer 100, and emerges on the viewer side of the liquid crystal display apparatus. In this case, the pixel appears light (white) when viewed from the viewer side.

Part (b) of FIG. 7 shows the condition in which no driving voltage is applied to the liquid crystal corresponding to the given pixel in the second liquid crystal panel 20. In this case, of the external light (L1) incident on the first absorptive polarizer 100, only linearly polarized light oriented in the direction (the horizontal direction in the figure) parallel to the polarization axis of the first absorptive polarizer 100 is allowed to pass through and enters the second liquid crystal panel 20. The linearly polarized light entering the second liquid crystal panel 20 passes therethrough with its direction of polarization twisted about 90 degrees. Since the transmission axis of the transflective film of the transflective liquid crystal panel 11 is oriented parallel to the direction of polarization of the light passed through the fourth absorptive polarizer 104, the light passed through the fourth absorptive polarizer 104 passes through the transflective liquid crystal panel 11. The light passed through the transflective liquid crystal panel 11 further passes through the second absorptive polarizer 103, and is absorbed by the backlight 30. In this case, the pixel appears dark (black) when viewed from the viewer side.

Part (c) of FIG. 7 shows the condition in which no driving voltage is applied to the liquid crystal corresponding to a given pixel in the transflective liquid crystal panel 11. In this case, of the light (L2) emitted from the backlight 30 and incident on the second absorptive polarizer 103, only linearly polarized light oriented in the direction (the horizontal direction in the figure) parallel to the polarization axis of the second absorptive polarizer 103 is allowed to pass through and enters the transflective liquid crystal panel 11. The linearly polarized light entering the transflective liquid crystal panel 11 passes therethrough with its direction of polarization twisted about 90 degrees. Since the polarization axis of the second absorptive polarizer 103 and the transmission axis of the transflective film of the transflective liquid crystal panel 11 are both oriented parallel to the direction of polarization of the light passed through the first liquid crystal panel 11, the light incident on the transflective liquid crystal panel 11 passes through the transflective liquid crystal panel 11 and the fourth absorptive polarizer 104, and enters the second liquid crystal panel 20. Since the second liquid crystal panel 20 is held in the off state, the linearly polarized light entering the second liquid crystal panel 20 passes therethrough with its direction of polarization twisted about 90 degrees. Since the direction of polarization of the light passed through the second liquid crystal panel 20 is parallel to the first absorptive polarizer 100, the light passed through the second liquid crystal panel 20 passes through the first absorptive polarizer 100 and emerges on the viewer side of the liquid crystal display apparatus. In this case, the pixel appears light (white) when viewed from the viewer side.

Part (d) of FIG. 7 shows the condition in which a driving voltage is applied to the liquid crystal corresponding to the given pixel in the transflective liquid crystal panel 11. In this case, of the light (L2) emitted from the backlight 30 and incident on the second absorptive polarizer 103, only linearly polarized light oriented in the direction (the horizontal direction in the figure) parallel to the polarization axis of the second absorptive polarizer 103 is allowed to pass through and enters the transflective liquid crystal panel 11. The linearly polarized light entering the transflective liquid crystal panel 11 passes through without changing its direction of polarization. Since the direction of polarization of the light passed through the transflective liquid crystal panel 11 is displaced 90 degrees relative to the polarization axis of the fourth absorptive polarizer 104, the light passed through the transflective liquid crystal panel 11 is absorbed by the fourth absorptive polarizer 104. In this case, the pixel appears dark (black) when viewed from the viewer side.

In this way, in the liquid crystal display apparatus 3 of FIG. 6 also, when operating the transflective liquid crystal panel 11 in the transmissive mode, the second liquid crystal panel 20 is held in the off state, and when operating the second liquid crystal panel 20 in the reflective mode, the transflective liquid crystal panel 11 is held in the off state. That is, when operating either one of the liquid crystal panels, the other liquid crystal panel can be turned off to reduce the power consumption of the liquid crystal display apparatus as a whole. Further, in the liquid crystal display apparatus 3 also, the liquid crystal is set so as to allow the light passed through the reflective liquid crystal panel 11 to pass through the transflective film of the transflective liquid crystal panel 11 when the transflective liquid crystal panel 11 is operated in the transmissive mode.

Figure 8:
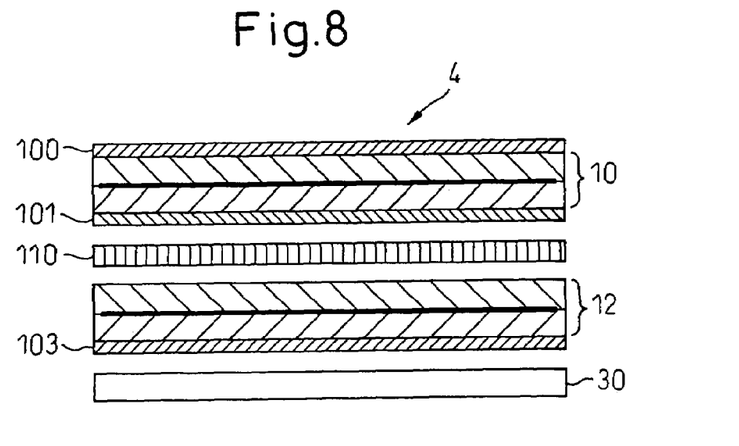
FIG. 8 is a schematic cross-sectional view of still another liquid crystal display apparatus 4 according to the present invention.

FIG. 8 is a schematic cross-sectional view of still another liquid crystal display apparatus 4 according to the present invention.

The liquid crystal display apparatus 4 shown in FIG. 8 differs from the liquid crystal display apparatus 1 shown in FIG. 2 in that a phase retarder 110 is inserted in place of the third absorptive polarizer 102, and in that the first liquid crystal panel is replaced by a VA liquid crystal panel 12 (or an STN liquid crystal panel).

The VA liquid crystal panel 12 is a liquid crystal panel that is similar in structure to the first liquid crystal panel 10 but is designed to achieve a wider viewing angle.

The operation of the liquid crystal display apparatus 4 shown in FIG. 8 is substantially the same as that shown in FIG. 3. Accordingly, in the liquid crystal display apparatus 4 of FIG. 8 also, when operating the VA liquid crystal panel 12 in the transmissive mode, the second liquid crystal panel 20 is held in the off state, and when operating the second liquid crystal panel 20 in the reflective mode, the VA liquid crystal panel 12 is held in the off state. That is, when operating either one of the liquid crystal panels, the other liquid crystal panel can be held in the off state, thereby reducing the power consumption of the liquid crystal display apparatus as a whole. Further, in the liquid crystal display apparatus 4 also, the liquid crystal is set so as to allow the light passed through the VA liquid crystal panel 12 to pass through the reflective polarizer 101 when the VA liquid crystal panel 12 is operated in the transmissive mode.

Figure 9:
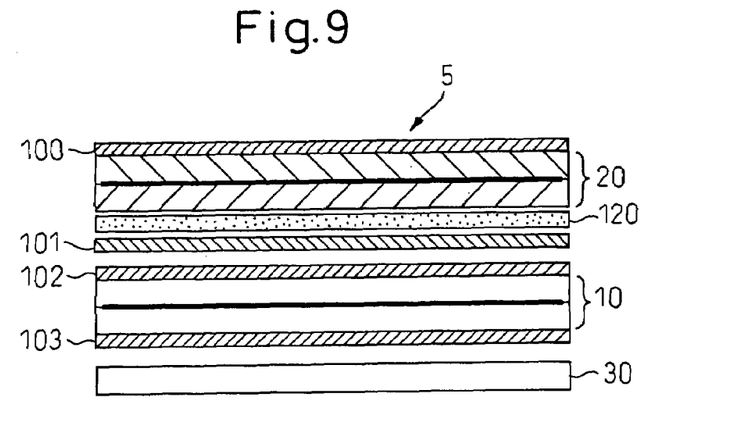
FIG. 9 is a schematic cross-sectional view of still another liquid crystal display apparatus 5 according to the present invention.

FIG. 9 is a schematic cross-sectional view of still another liquid crystal display apparatus 5 according to the present invention.

The liquid crystal display apparatus 5 shown in FIG. 9 differs from the liquid crystal display apparatus 1 shown in FIG. 2 in that a color polarizer 120 is inserted between the second liquid crystal panel 20 and the reflective polarizer 101. The color polarizer 120 has the function of applying a desired color to the external light reflected by the reflective polarizer 101 and returning toward the viewer side in FIG. 3(a). Accordingly, if the color polarizer 120 is a B-color polarizer, then when the second liquid crystal panel 20 is operated in the reflective mode, the pixel appears blue-colored in the bright display state.

The operation of the liquid crystal display apparatus 5 shown in FIG. 9 is substantially the same as that shown in FIG. 3, the only difference being the inclusion of the color polarizer 120. Accordingly, in the liquid crystal display apparatus 5 of FIG. 9 also, when operating the first liquid crystal panel 10 in the transmissive mode, the second liquid crystal panel 20 is held in the off state, and when operating the second liquid crystal panel 20 in the reflective mode, the first liquid crystal panel 10 is held in the off state. That is, when operating either one of the liquid crystal panels, the other liquid crystal panel can be held in the off state, thereby reducing the power consumption of the liquid crystal display apparatus as a whole. Further, in the liquid crystal display apparatus 5 also, the liquid crystal is set so as to allow the light passed through the first liquid crystal panel 10 to pass through the reflective polarizer 101 when the first liquid crystal panel 10 is operated in the transmissive mode.

Figure 10:
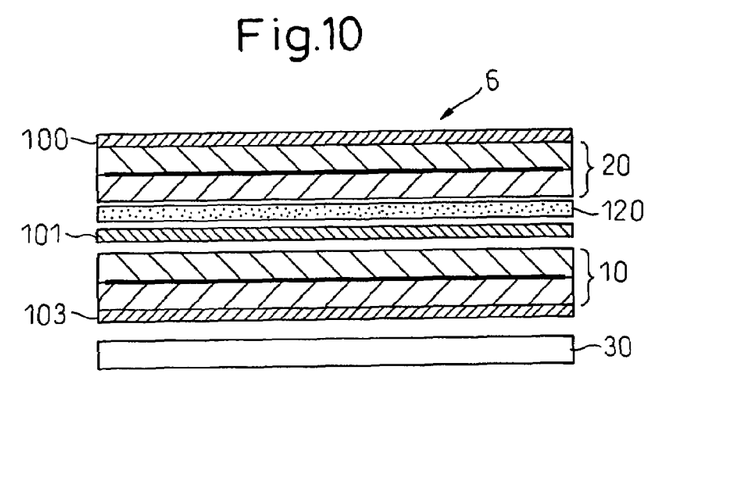
FIG. 10 is a schematic cross-sectional view of still another liquid crystal display apparatus 6 according to the present invention.

FIG. 10 is a schematic cross-sectional view of still another liquid crystal display apparatus 6 according to the present invention.

The liquid crystal display apparatus 6 shown in FIG. 10 differs from the liquid crystal display apparatus 1 shown in FIG. 2 in that a color polarizer 120 is inserted between the second liquid crystal panel 20 and the reflective polarizer 101, and in that the third absorptive polarizer 102 provided between the reflective polarizer 101 and the first liquid crystal panel 10 is eliminated. As in the liquid crystal display apparatus 5 shown in FIG. 9, the color polarizer 120 has the function of applying a desired color to the external light reflected by the reflective polarizer 101 and returning toward the viewer side in FIG. 3(a). Accordingly, if the color polarizer 120 is a B-color polarizer, then when the second liquid crystal panel 20 is operated in the reflective mode, the pixel appears blue-colored in the bright display state.

The operation of the liquid crystal display apparatus 6 shown in FIG. 10 is substantially the same as that shown in FIG. 3, the only difference being the elimination of the third absorptive polarizer 102 and the inclusion of the color polarizer 120. Accordingly, in the liquid crystal display apparatus 6 of FIG. 10 also, when operating the first liquid crystal panel 10 in the transmissive mode, the second liquid crystal panel 20 is held in the off state, and when operating the second liquid crystal panel 20 in the reflective mode, the first liquid crystal panel 10 is held in the off state. That is, when operating either one of the liquid crystal panels, the other liquid crystal panel can be held in the off state, thereby reducing the power consumption of the liquid crystal display apparatus as a whole. Further, in the liquid crystal display apparatus 6 also, the liquid crystal is set so as to allow the light passed through the first liquid crystal panel 10 to pass through the reflective polarizer 101 when the first liquid crystal panel 10 is operated in the transmissive mode.

Figure 11:
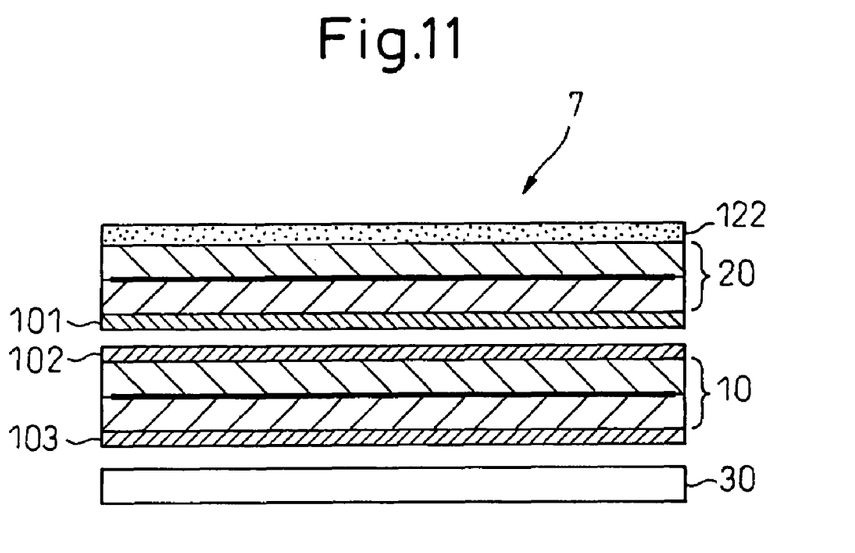
FIG. 11 is a schematic cross-sectional view of still another liquid crystal display apparatus 7 according to the present invention.

FIG. 11 is a schematic cross-sectional view of still another liquid crystal display apparatus 7 according to the present invention.

The liquid crystal display apparatus 7 shown in FIG. 11 differs from the liquid crystal display apparatus 1 shown in FIG. 2 in that a color polarizer 122 is inserted in place of the first absorptive polarizer 100 arranged on the viewer side of the second liquid crystal panel 20. The color polarizer 122 has the function of applying a desired color to the external light reflected by the reflective polarizer 101 and returning toward the viewer side in FIG. 3(*a*). Accordingly, if the color polarizer 122 is a B-color polarizer, then when the second liquid crystal panel 20 is operated in the reflective mode, the pixel appears blue-colored in the bright display state.

The operation of the liquid crystal display apparatus 7 shown in FIG. 11 is substantially the same as that shown in FIG. 3, the only difference being the inclusion of the color polarizer 122 in place of the first absorptive polarizer 100. Accordingly, in the liquid crystal display apparatus 7 of FIG. 11 also, when operating the first liquid crystal panel 10 in the transmissive mode, the second liquid crystal panel 20 is held in the off state, and when operating the second liquid crystal panel 20 in the reflective mode, the first liquid crystal panel 10 is held in the off state. That is, when operating either one of the liquid crystal panels, the other liquid crystal panel can be held in the off state, thereby reducing the power consumption of the liquid crystal display apparatus as a whole. Further, in the liquid crystal display apparatus 7 also, the liquid crystal is set so as to allow the light passed through the first liquid crystal panel 10 to pass through the reflective polarizer 101 when the first liquid crystal panel 10 is operated in the transmissive mode.

Figure 12:
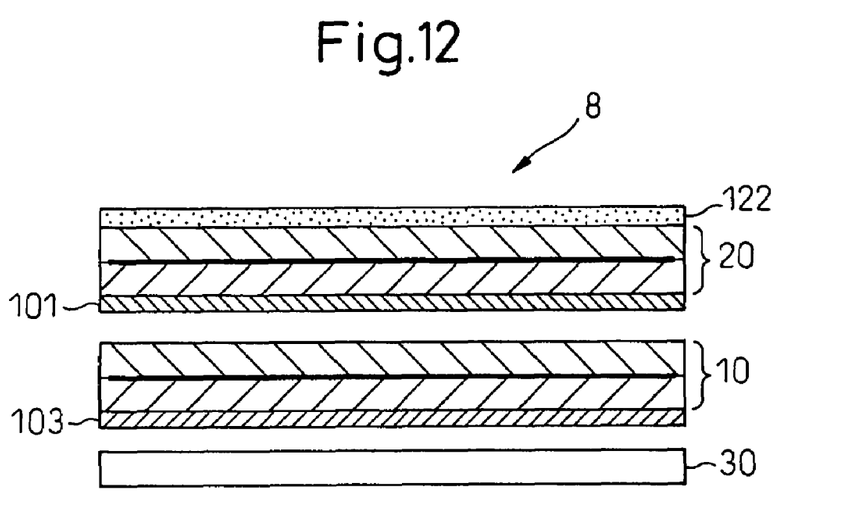
FIG. 12 is a schematic cross-sectional view of still another liquid crystal display apparatus 8 according to the present invention.

FIG. 12 is a schematic cross-sectional view of still another liquid crystal display apparatus 8 according to the present invention.

The liquid crystal display apparatus 8 shown in FIG. 12 differs from the liquid crystal display apparatus 1 shown in FIG. 2 in that a color polarizer 122 is inserted in place of the first absorptive polarizer 100 arranged on the viewer side of the second liquid crystal panel 20, and in that the third absorptive polarizer 102 provided between the reflective polarizer 101 and the first liquid crystal panel 10 is eliminated. As in the liquid crystal display apparatus 7 shown in FIG. 11, the color polarizer 122 has the function of applying a desired color to the external light reflected by the reflective polarizer 101 and returning toward the viewer side in FIG. 3(*a*). Accordingly, if the color polarizer 122 is a B-color polarizer, then when the second liquid crystal panel 20 is operated in the reflective mode, the pixel appears blue-colored in the bright display state.

The operation of the liquid crystal display apparatus 8 shown in FIG. 12 is substantially the same as that shown in FIG. 3, the only difference being the inclusion of the color polarizer 122 in place of the first absorptive polarizer 100 and the elimination of the third absorptive polarizer 102. Accordingly, in the liquid crystal display apparatus 8 of FIG. 12 also, when operating the first liquid crystal panel 10 in the transmissive mode, the second liquid crystal panel 20 is held in the off state, and when operating the second liquid crystal panel 20 in the reflective mode, the first liquid crystal panel 10 is held in the off state. That is, when operating either one of the liquid crystal panels, the other liquid crystal panel can be held in the off state, thereby reducing the power consumption of the liquid crystal display apparatus as a whole. Further, in the liquid crystal display apparatus 8 also, the liquid crystal is set so as to allow the light passed through the first liquid crystal panel 10 to pass through the reflective polarizer 101 when the first liquid crystal panel 10 is operated in the transmissive mode.

Like the liquid crystal display apparatus 1, any of the liquid crystal display apparatuses 2 to 8 according to the present invention described above can be used as a display unit in a mobile phone or the like, and can then achieve the same effect as that achieved with the liquid crystal display apparatus 1. In the liquid crystal display apparatuses 1 to 8 according to the present invention described above, the first liquid crystal panel 10 has been operated in the transmissive mode. However, it is also possible to construct the apparatus so that the first liquid crystal panel 10 is operated in the reflective mode.

What is claimed is:

1. A liquid crystal display apparatus comprising:
   a first liquid crystal display having a viewing mode of at least one of a transmissive mode and a reflective mode;
   a second liquid crystal display having a viewing mode of at least one of a transmissive mode and a reflective mode, and disposed above said first liquid crystal display with a viewing side of each of said displays facing upward;
   a backlight, disposed behind said first liquid crystal display, for illuminating said first liquid crystal display;
   a first absorptive polarizer disposed between said first liquid crystal display and said backlight;
   a second absorptive polarizer disposed on an upper side of said second liquid crystal display; and
   a reflective polarizer, disposed between said first liquid crystal display and said second liquid crystal display, for reflecting external light that passed through said second liquid crystal display,
   wherein the maximum power consumption of said second liquid crystal display is smaller than that of said first liquid crystal display.

2. The liquid crystal display apparatus according to claim 1, wherein a display is produced by switching between
   a first state in which said first liquid crystal display is operated with said backlight turned on while holding said second liquid crystal display off, and
   a second state in which said second liquid crystal display is operated with said backlight turned off while holding said first liquid crystal display off.

3. The liquid crystal display apparatus according to claim 1, wherein said second liquid crystal display has fewer pixels than said first liquid crystal display.

4. The liquid crystal display apparatus according to claim 1, wherein said first liquid crystal display is dot-matrix driven by a passive driving method, and said second liquid crystal display is static-driven.

5. The liquid crystal display apparatus according to claim 1, wherein said second liquid crystal display is driven by a passive driving method, and said first liquid crystal display is driven by an active driving method.

6. The liquid crystal display apparatus according to claim 5, wherein said second liquid crystal display is static-driven or dot-matrix driven.

7. The liquid crystal display apparatus according to claim 1, wherein said first liquid crystal display is a polymer-scattered liquid crystal display.

8. The liquid crystal display apparatus according to claim 1, further comprising a third absorptive polarizer disposed between said reflective polarizer and said first liquid crystal display.

9. The liquid crystal display apparatus according to claim 1, further comprising a phase retarder disposed between said reflective polarizer and said first liquid crystal display.

10. The liquid crystal display apparatus according to claim 1, further comprising a color polarizer disposed between said second liquid crystal display and said reflective polarizer.

11. The liquid crystal display apparatus according to claim 1, further comprising a third absorptive polarizer disposed between said reflective polarizer and said first liquid crystal display.

12. A liquid crystal display apparatus comprising:
a first liquid crystal display having a viewing mode of at least one of a transmissive mode and a reflective mode;
a second liquid crystal display having a viewing mode of at least one of a transmissive mode and a reflective mode, and disposed above said first liquid crystal display with a viewing side of each of said displays facing upward;
a backlight, disposed behind said first liquid crystal display, for illuminating said first liquid crystal display;
a first absorptive polarizer disposed between said first liquid crystal display and said backlight;
a second absorptive polarizer disposed on an upper side of said second liquid crystal display; and
a fourth absorptive polarizer disposed between said first liquid crystal display and said second liquid crystal display,
wherein said first liquid crystal display is a transflective liquid crystal display capable of reflecting external light that passed through said second liquid crystal display, and
wherein the maximum power consumption of said second liquid crystal display is smaller than that of said first liquid crystal display.

13. A liquid crystal display apparatus comprising:
a first liquid crystal display having a viewing mode of at least one of a transmissive mode and a reflective mode;
a second liquid crystal display having a viewing mode of at least one of a transmissive mode and a reflective mode, and disposed above said first liquid crystal display with a viewing side of each of said displays facing upward;
a backlight, disposed behind said first liquid crystal display, for illuminating said first liquid crystal display;
a first absorptive polarizer disposed between said first liquid crystal display and said backlight;
a color polarizer disposed on an upper side of said second liquid crystal display; and
a reflective polarizer, disposed between said first liquid crystal display and said second liquid crystal display, for reflecting external light that passed through said second liquid crystal display,
wherein the maximum power consumption of said second liquid crystal display is smaller than that of said first liquid crystal display.

14. The liquid crystal display apparatus according to claim 13, further comprising a third absorptive polarizer disposed between said reflective polarizer and said first liquid crystal display.

* * * * *